US010544327B2

(12) United States Patent
Laas et al.

(10) Patent No.: US 10,544,327 B2
(45) Date of Patent: Jan. 28, 2020

(54) SCRATCH-RESISTANT AQUEOUS 2K PU COATINGS

(71) Applicant: Covestro Deutschland AG, Leverkusen (DE)

(72) Inventors: Hans-Josef Laas, Odenthal (DE); Robert Reyer, Langenfeld (DE)

(73) Assignee: Covestro Deutschland AG, Leverkusen (DE)

(*) Notice: Subject to any disclaimer, the term of this patent is extended or adjusted under 35 U.S.C. 154(b) by 127 days.

(21) Appl. No.: 15/758,450

(22) PCT Filed: Sep. 7, 2016

(86) PCT No.: PCT/EP2016/071002
§ 371 (c)(1),
(2) Date: Mar. 8, 2018

(87) PCT Pub. No.: WO2017/042175
PCT Pub. Date: Mar. 16, 2017

(65) Prior Publication Data
US 2018/0265736 A1    Sep. 20, 2018

(30) Foreign Application Priority Data
Sep. 9, 2016  (EP) .................... 15184420

(51) Int. Cl.
| C08G 18/62 | (2006.01) |
| C08G 18/72 | (2006.01) |
| C08G 18/73 | (2006.01) |
| C08G 18/78 | (2006.01) |
| C08G 18/79 | (2006.01) |
| C08G 18/80 | (2006.01) |
| C08G 18/08 | (2006.01) |
| C08G 18/22 | (2006.01) |
| C08G 18/28 | (2006.01) |
| C09D 175/04 | (2006.01) |
| C08G 18/77 | (2006.01) |
| C09D 5/00 | (2006.01) |

(52) U.S. Cl.
CPC ....... *C09D 175/04* (2013.01); *C08G 18/0866* (2013.01); *C08G 18/6225* (2013.01); *C08G 18/778* (2013.01); *C09D 5/00* (2013.01)

(58) Field of Classification Search
CPC .... C09D 175/04; C09D 5/00; C08G 18/0866; C08G 18/6225; C08G 18/778
USPC ....................................................... 524/560
See application file for complete search history.

(56) References Cited

U.S. PATENT DOCUMENTS

| 3,640,967 A | 2/1972 | König et al. |
| 3,769,318 A | 10/1973 | Windemuth et al. |
| 4,160,080 A | 7/1979 | König et al. |
| 4,663,377 A | 5/1987 | Hombach et al. |
| 4,837,359 A | 6/1989 | Woynar et al. |
| 4,960,848 A | 10/1990 | Scholl et al. |
| 4,994,541 A | 2/1991 | Dell et al. |
| 5,075,370 A | 12/1991 | Kubitza et al. |
| 5,076,958 A | 12/1991 | Pedain et al. |
| 5,252,696 A | 10/1993 | Laas et al. |
| 5,387,367 A | 2/1995 | Haeberle et al. |
| 5,387,642 A | 2/1995 | Blum et al. |
| 5,670,600 A | 9/1997 | Nienhaus et al. |
| 5,854,338 A | 12/1998 | Hovestadt et al. |
| 5,914,383 A | 6/1999 | Richter et al. |
| 6,090,939 A | 7/2000 | Richter et al. |
| 6,376,602 B1 | 4/2002 | Probst et al. |
| 6,426,414 B1 | 7/2002 | Laas et al. |
| 6,756,464 B2 | 6/2004 | Hofacker et al. |
| 6,765,111 B1 | 7/2004 | Pedain et al. |
| 6,767,958 B2 | 7/2004 | Laas et al. |
| 7,879,407 B2 | 2/2011 | Poppeq et al. |
| 7,956,209 B2 | 6/2011 | Laas et al. |
| 8,013,099 B2 | 9/2011 | Poppe et al. |
| 8,569,438 B2 | 10/2013 | Groenewolt et al. |
| 8,658,752 B2 | 2/2014 | Groenewolt et al. |
| 8,808,805 B2 | 8/2014 | Groenewolt et al. |
| 9,017,818 B2 | 4/2015 | Groenewolt |
| 9,353,210 B2 | 5/2016 | Laas et al. |
| 9,371,469 B2 | 6/2016 | Groenewolt et al. |
| 9,644,111 B2 | 5/2017 | Hoffmann et al. |
| 9,777,190 B2 | 10/2017 | Groenewolt et al. |
| 2001/0021746 A1 | 9/2001 | Nabavi et al. |
| 2003/0027921 A1 | 2/2003 | Speier et al. |
| 2011/0082273 A1 | 4/2011 | Laas et al. |
| 2012/0101210 A1 | 4/2012 | Nennemann et al. |
| 2015/0259461 A1* | 9/2015 | Laas ............... C08G 18/4825 525/102 |
| 2016/0122583 A1 | 5/2016 | Groenewolt et al. |
| 2016/0280836 A1 | 9/2016 | Ji et al. |

FOREIGN PATENT DOCUMENTS

| CA | 1081389 A | 7/1980 |
| CA | 2101876 A1 | 2/1994 |
| CA | 2244486 A1 | 2/1999 |
| DE | 1670666 A1 | 7/1971 |
| DE | 2356768 B1 | 1/1975 |
| DE | 1770245 B2 | 9/1975 |
| DE | 3700209 A1 | 7/1988 |
| DE | 3900053 A1 | 7/1990 |
| EP | 0000194 A1 | 1/1979 |
| EP | 0206059 A2 | 12/1986 |
| EP | 0330966 A2 | 9/1989 |

(Continued)

*Primary Examiner* — Kelechi C Egwim
(74) *Attorney, Agent, or Firm* — Drinker Biddle & Reath LLP

(57) ABSTRACT

The invention relates to aqueous two-component coating compositions based on preferably hydroxy-functional and/or amino-functional aqueous polymer dispersions and thioallophanates containing silane groups as crosslinking agents, to a method for producing them and to the use of these coating compositions for producing coatings.

19 Claims, No Drawings

(56) References Cited

FOREIGN PATENT DOCUMENTS

| | | |
|---|---|---|
| EP | 0336205 A2 | 10/1989 |
| EP | 0339396 A1 | 11/1989 |
| EP | 0358979 A2 | 3/1990 |
| EP | 0469389 A1 | 2/1992 |
| EP | 0486881 A2 | 5/1992 |
| EP | 0496205 A1 | 7/1992 |
| EP | 0540985 A1 | 5/1993 |
| EP | 0557844 A1 | 9/1993 |
| EP | 0583728 A1 | 2/1994 |
| EP | 0649866 A1 | 4/1995 |
| EP | 0798299 A1 | 10/1997 |
| EP | 0872499 A1 | 10/1998 |
| EP | 0896009 A1 | 2/1999 |
| EP | 0949284 A1 | 10/1999 |
| EP | 0959087 A1 | 11/1999 |
| EP | 0962455 A1 | 12/1999 |
| EP | 1273640 A2 | 1/2003 |
| EP | 2014692 A2 | 1/2009 |
| EP | 2046861 A1 | 4/2009 |
| EP | 2236531 A1 | 10/2010 |
| EP | 2305691 A1 | 4/2011 |
| GB | 994890 A | 6/1965 |
| GB | 1145952 A | 3/1969 |
| WO | WO-9403511 A1 | 2/1994 |
| WO | WO-9420559 A1 | 9/1994 |
| WO | WO-9428043 A1 | 12/1994 |
| WO | WO-9502005 A1 | 1/1995 |
| WO | WO-9731960 A1 | 9/1997 |
| WO | WO-0188006 A1 | 11/2001 |
| WO | WO-02059224 A1 | 8/2002 |
| WO | WO-2005047357 A2 | 5/2005 |
| WO | WO-2006042658 A1 | 4/2006 |
| WO | WO-2007033786 A1 | 3/2007 |
| WO | WO-2008013731 A1 | 1/2008 |
| WO | WO-2008074489 A1 | 6/2008 |
| WO | WO-2008074490 A1 | 6/2008 |
| WO | WO-2009077180 A1 | 6/2009 |
| WO | WO-2009156148 A1 | 12/2009 |
| WO | WO-2010149236 A1 | 12/2010 |
| WO | WO-2012098014 A1 | 7/2012 |
| WO | WO-2012168079 A1 | 12/2012 |
| WO | WO-2014016019 A1 | 1/2014 |
| WO | WO-2014037265 A1 | 3/2014 |
| WO | WO-2014086530 A1 | 6/2014 |
| WO | WO-2015035673 A1 | 3/2015 |

* cited by examiner

SCRATCH-RESISTANT AQUEOUS 2K PU COATINGS

CROSS-REFERENCE TO RELATED APPLICATIONS

This application is a national stage application (under 35 U.S.C. § 371) of PCT/EP2016/071002, filed Sep. 7, 2016, which claims benefit of European Application No. 15184420.6, filed Sep. 9, 2015, both of which are incorporated herein by reference in their entirety.

The invention relates to aqueous two-component coating compositions based on preferably hydroxy-functional and/or amino-functional aqueous polymer dispersions and thioallophanates containing silane groups as crosslinking agents, to a method for producing them and to the use of these coating compositions for producing coatings.

Aqueous coating systems are nowadays firmly established for various fields of application as an eco-friendly alternative to solventborne coating compositions. Aqueous two-component polyurethane (2K PU) coating materials in particular, comprising low-viscosity hydrophobic or hydrophilic, self-emulsifying polyisocyanates as crosslinker components, allow coatings of extremely high quality to be produced.

In order to obtain specific coatings properties, such as to improve the adhesion, the chemical resistance or the scratch resistance, for example, polyisocyanate mixtures containing alkoxysilane groups have also already been used in the past in aqueous coating systems.

For example, EP-A 0 872 499 describes aqueous two-component polyurethane coating materials which as their crosslinker component comprise compounds having isocyanate groups and alkoxysilyl groups. The use of these specific polyisocyanates leads to coatings having improved water resistance in conjunction with high gloss.

Hydrophilically modified polyisocyanates containing alkoxysilane groups, which are therefore easier to emulsify, have likewise already been identified as crosslinker components for aqueous two-component coatings dispersions and adhesion dispersions (e.g. EP-A 0 949 284).

In order to improve the scratch resistance and chemical resistance of aqueous thermosetting 2K PU automotive clearcoat and top coat materials, WO 2012/098014 proposed reaction products of aliphatic and/or cycloaliphatic polyisocyanates with specific mixtures of bis(alkoxysilylalkyl)amines and N-alkyl mono(alkoxysilylalkyl)amines as crosslinker component.

A feature common to all of these polyisocyanate mixtures containing silane groups that have been described so far for use in aqueous coating systems is that they are prepared by proportional reaction of unmodified polyisocyanates with organofunctional silanes that contain groups reactive toward isocyanate groups, examples being mercapto-functional silanes, primary aminoalkylsilanes, secondary N-alkyl-substituted aminoalkylsilanes or alkoxysilane-functional aspartic esters.

Any such reaction, however, leads inevitably to a reduction in the average isocyanate functionality, based on that of the starting polyisocyanates used, this effect becoming greater as the target silane content in the reaction product goes up. In practice in the aforementioned applications, such as in clearcoat materials, for example, polyisocyanate crosslinkers with extremely high isocyanate functionality are specifically desired, however, in order to achieve high network density.

Furthermore, as the degree of modification—that is, the silane group content—goes up, there is also a drastic increase in the viscosity of the products, owing to the thiourethane groups and, more particularly, urea groups that have been introduced into the molecule, and for this reason the polyisocyanates known to date and containing silane groups can generally only be used in hydrophilized form with even further reduced functionality and using considerable amounts of organic solvents, in dissolved form.

It was an object of the present invention, therefore, to provide new aqueous coating compositions for producing scratch-resistant coating materials, these compositions employing polyisocyanate crosslinkers containing silane groups and having sufficiently low viscosities, even when the levels of silane groups are high, to be able to be incorporated in finely divided form, even in non-hydrophilized form, into the aqueous phase.

This object has been achieved with the provision of the coating compositions of the invention, which are described in more detail below.

The present invention provides aqueous coating compositions comprising

A) at least one polyisocyanate component,

B) at least one aqueous polymer dispersion,

C) optionally at least one catalyst for the crosslinking of silane groups and

D) optionally further auxiliaries and additives, where the polyisocyanate component A) comprises at least one thioallophanate containing silane groups, of the general formula (I),

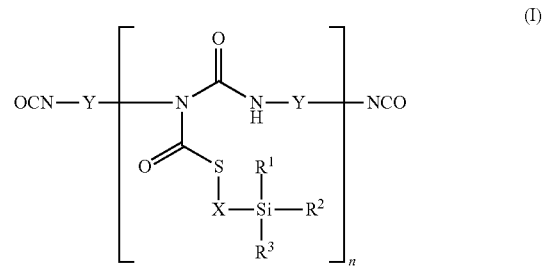

in which

R$^1$, R$^2$ and R$^3$ are identical or different radicals and are each a saturated or unsaturated, linear or branched, aliphatic or cycloaliphatic or an optionally substituted aromatic or araliphatic radical having up to 18 carbon atoms, which may optionally contain up to 3 heteroatoms from the series of oxygen, sulphur and nitrogen, X is a linear or branched organic radical having at least 2 carbon atoms, Y is a linear or branched, aliphatic or cycloaliphatic, an araliphatic or aromatic radical having up to 18 carbon atoms and n is an integer from 1 to 20.

The invention also provides for the use of these coating compositions for producing polyurethane paints and coatings, and also the substrates coated with the coating compositions.

The polyisocyanate component A) of the coating compositions of the invention comprises at least one thioallophanate containing silane groups, of the general formula (I)

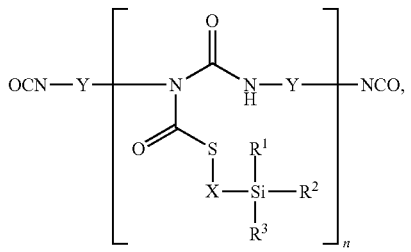

in which
R¹, R² and R³ are identical or different radicals and are each a saturated or unsaturated, linear or branched, aliphatic or cycloaliphatic or an optionally substituted aromatic or araliphatic radical having up to 18 carbon atoms, which may optionally contain up to 3 heteroatoms from the series of oxygen, sulphur and nitrogen,
X is a linear or branched organic radical having at least 2 carbon atoms,
Y is a linear or branched, aliphatic or cycloaliphatic, an araliphatic or aromatic radical having up to 18 carbon atoms and
n is an integer from 1 to 20.

In one preferred embodiment of the present invention, the polyisocyanate component A) of the coating compositions of the invention consists of at least one thioallophanate containing silane groups, of the general formula (I).

These thioallophanates containing silane groups are prepared by reacting
a) at least one monomeric diisocyanate of the general formula (II)

OCN—Y—NCO          (II), in which Y is a linear or branched, aliphatic or cycloaliphatic, an araliphatic or aromatic radical having up to 18 carbon atoms, with
b) mercaptosilanes of the general formula (III)

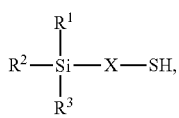

(III)

in which
R¹, R², R³ and X are as defined above,
in an equivalent ratio of isocyanate groups to mercapto groups of 2:1 to 40:1.

Suitable starting compounds a) for preparing the thioallophanates B) containing the silane groups are any desired diisocyanates having aliphatically, cycloaliphatically, araliphatically and/or aromatically bonded isocyanate groups, which may be prepared by any desired methods, as for example by phosgenation or by a phosgene-free route, by means of urethane cleavage, for example.

Suitable diisocyanates are, for example, those of the general formula (II)

OCN—Y—NCO          (II)

in which Y is a linear or branched, aliphatic or cycloaliphatic radical having up to 18 carbon atoms, preferably 4 to 18 carbon atoms, or an optionally substituted aromatic or araliphatic radical having up to 18 carbon atoms, preferably 5 to 18 carbon atoms, such as, for example, 1,4-diisocyanatobutane, 1,5-diisocyanatopentane (PDI), 1,6-diisocyanatohexane (HDI), 1,5-diisocyanato-2,2-dimethylpentane, 2,2,4- and/or 2,4,4-trimethyl-1,6-diisocyanatohexane, 1,8-diisocyanatooctane, 1,9-diisocyanatononane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H₁₂-MDI), 1,3- and 1,4-bis(isocyanatomethyl)cyclohexane, 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene, 1,3- and 1,4-bis(1-isocyanato-1-methylethyl)benzene (TMXDI), bis(4-(1-isocyanato-1-methylethyl)phenyl) carbonate, 1,3- and 1,4-phenylene diisocyanate, 2,4- and 2,6-tolylene diisocyanate, and any desired mixtures of these isomers, diphenylmethane 2,4'- and/or -4,4'-diisocyanate and naphthylene 1,5-diisocyanate, and any desired mixtures of such diisocyanates. Further diisocyanates which are likewise suitable are found, furthermore, for example, in Justus Liebigs Annalen der Chemie Volume 562 (1949) pp. 75-136.

Particularly preferred as starting component a) are diisocyanates of the general formula (II), in which Y is a linear or branched, aliphatic or cycloaliphatic radical having 5 to 13 carbon atoms.

Especially preferred starting components a) for the method of the invention are 1,5-diisocyanatopentane, 1,6-diisocyanatohexane, 1-isocyanato-3,3,5-trimethyl-5-isocyanatomethylcyclohexane, 2,4'- and/or 4,4'-diisocyanatodicyclohexylmethane or any desired mixtures of these diisocyanates.

The starting components b) for preparing the thioallophanates containing silane groups are any desired mercaptosilanes of the general formula (III)

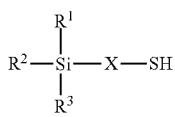

(III)

in which
R¹, R² and R³ are identical or different radicals and are each a saturated or unsaturated, linear or branched, aliphatic or cycloaliphatic or an optionally substituted aromatic or araliphatic radical having up to 18 carbon atoms, which may optionally contain up to 3 heteroatoms from the series of oxygen, sulphur and nitrogen, and
X is a linear or branched organic radical having at least 2 carbon atoms.

Examples of suitable mercaptosilanes b) are 2-mercaptoethyltrimethylsilane, 2-mercaptoethylmethyldimethoxysilane, 2-mercaptoethyltrimethoxysilane, 2-mercaptoethyltriethoxysilane, 3-mercaptopropylmethyldimethoxysilane, 3-mercaptopropyldimethylmethoxysilane, 3-mercaptopropyltrimethoxysilane, 3-mercaptopropylmethyldiethoxysilane, 3-mercaptopropyltriethoxysilane, 3-mercaptopropylethyldimethoxysilane, 3-mercaptopropylethyldiethoxysilane and/or 4-mercaptobutyltrimethoxysilane.

Preferred mercaptosilanes b) for preparing the thioallophanates containing silane groups are those of the general formula (III) in which
$R^1$, $R^2$ and $R^3$ are identical or different radicals and are each a saturated, linear or branched, aliphatic or cycloaliphatic radical having up to 6 carbon atoms, and may optionally contain up to 3 oxygen atoms, and
X is a linear or branched alkylene radical having 2 to 10 carbon atoms.

Particularly preferred mercaptosilanes b) are those of the general formula (III) in which
$R^1$, $R^2$ and $R^3$ are each alkyl radicals having up to 6 carbon atoms and/or alkoxy radicals which contain up to 3 oxygen atoms, with the proviso that at least one of the radicals $R^1$, $R^2$ and $R^3$ is such an alkoxy radical, and
X is a propylene radical (—$CH_2$—$CH_2$—$CH_2$—).

Especially preferred mercaptosilanes b) are those of the general formula (II) in which
$R^1$, $R^2$ and $R^3$ are identical or different radicals and are each methyl, methoxy or ethoxy, with the proviso that at least one of the radicals $R^1$, $R^2$ and $R^3$ is a methoxy or ethoxy radical, and
X is a propylene radical (—$CH_2$—$CH_2$—$CH_2$—).

For preparing the thioallophanates containing silane groups, the diisocyanates a) are reacted with the mercaptosilanes b) at temperatures from 20 to 200° C., preferably 40 to 160° C., observing an equivalents ratio of isocyanate groups to mercapto groups of 2:1 to 40:1, preferably from 4:1 to 30:1, particularly preferably 6:1 to 20:1, to give thioallophanates.

The reaction can be carried out without catalyst, as a thermally induced allophanatization. Preferably, however, suitable catalysts are used for accelerating the allophanatization reaction. These are the customary known allophanatization catalysts, examples being metal carboxylates, metal chelates or tertiary amines of the type described in GB-A 0 994 890, or alkylating agents of the type described in U.S. Pat. No. 3,769,318, or strong acids as described by way of example in EP-A 0 000 194.

Suitable allophanatization catalysts are, in particular zinc compounds, such as zinc(II) stearate, zinc(II) n-octanoate, zinc(II) 2-ethyl-1-hexanoate, zinc(II) naphthenate or zinc(II) acetylacetonate, tin compounds, such as tin(II) n-octanoate, tin(II) 2-ethyl-1-hexanoate, tin(II) laurate, dibutyltin oxide, dibutyltin dichloride, dibutyltin diacetate, dibutyltin dilaurate, dibutyltin dimaleate or dioctyltin diacetate, zirconium compounds, such as zirconium(IV) 2-ethyl-1-hexanoate, zirconium(IV) neodecanoate, zirconium(IV) naphthenate or zirconium(IV) acetylacetonate, aluminium tri(ethylacetoacetate), iron(III) chloride, potassium octoate, manganese, cobalt or nickel compounds, and also strong acids, such as trifluoroacetic acid, sulphuric acid, hydrogen chloride, hydrogen bromide, phosphoric acid or perchloric acid, for example, or any desired mixtures of these catalysts.

Also suitable catalysts, or be it less preferably, for preparing the thioallophanates containing silane groups are compounds which as well as the allophanatization reaction also catalyse the trimerization of isocyanate groups to form isocyanurate structures. Catalysts of this kind are described for example in EP-A0 649 866 at page 4, line 7 to page 5, line 15.

Preferred catalysts for preparing the thioallophanates containing silane groups are zinc and/or zirconium compounds of the aforementioned kind. Especially preferred is the use of zinc(II) n-octanoate, zinc(II) 2-ethyl-1-hexanoate and/or zinc(II) stearate, zirconium(IV) n-octanoate, zirconium(IV) 2-ethyl-1-hexanoate and/or zirconium(IV) neodecanoate.

In the preparation of the thioallophanates containing silane groups, these catalysts are employed, if at all, in an amount of 0.001 to 5 wt %, preferably 0.005 to 1 wt %, based on the total weight of the reactants a) and b), and may be added both before the start of reaction and at any point during the reaction.

The preparation of the thioallophanates containing silane groups is preferably carried out without solvent. Optionally, however, it is also possible to use suitable solvent which are inert relative to the reactive groups of the starting components. Suitable solvents are, for example, the customary paint solvents that are known per se such as ethyl acetate, butyl acetate, ethylene glycol monomethyl or monoethyl ether acetate, 1-methoxyprop-2-yl acetate (MPA), 3-methoxy-n-butyl acetate, acetone, 2-butanone, 4-methyl-2-pentanone, cyclohexanone, toluene, xylene, chlorobenzene, white spirit, more highly substituted aromatics, of the kind available commercially, for example, under the names Solventnaphtha, Solvesso®, Isopar®, Nappar®, Varsol® (ExxonMobil Chemical Central Europe, Cologne, DE) and Shellsol® (Shell Deutschland Oil GmbH, Hamburg, DE), and also solvents such as propylene glycol diacetate, diethylene glycol dimethyl ether, dipropylene glycol dimethyl ether, diethylene glycol ethyl and butyl ether acetate, N-methylpyrrolidone and N-methylcaprolactam, or any desired mixtures of such solvents. These solvents or solvent mixtures preferably include a water content of at most 1.0 wt %, more preferably at most 0.5 wt %, based on solvent used.

In one embodiment, during the preparation of the thioallophanates containing silane groups, the starting diisocyanate a) or a mixture of different starting diisocyanates a) is introduced optionally under inert gas, such as nitrogen, for example, and optionally in the presence of a suitable solvent of the stated kind, at a temperature between 20 and 100° C. Subsequently the mercaptosilane b) or a mixture of different mercaptosilanes is added in the amount stated above, and the reaction temperature for the thiourethanization is adjusted optionally by an appropriate measure (heating or cooling) to a temperature of 30 to 120° C., preferably of 50 to 100° C. Following the thiourethanization reaction, i.e. when the NCO content reached is that corresponding theoretically to complete conversion of isocyanate groups and mercapto groups, the thioallophanatization may be started, for example, without addition of catalyst, by heating of the reaction mixture to a temperature of 120 to 200° C. Preferably, however, suitable catalysts of the above-stated kind are employed in order to accelerate the thioallophanatization reaction, in which case, depending on the nature and amount of the catalyst used, temperatures in the range from 60 to 140° C., preferably 70 to 120° C., are sufficient for implementing the reaction.

In another embodiment of the method for producing the thioallophanates containing silane groups, the catalyst for optional accompanying use is admixed either to the diisocyanate component a) and/or to the silane component b) even before the start of the actual reaction. In this case the thiourethane groups formed as intermediates undergo spontaneous further reaction to give the desired thioallophanate structure. In this kind of one-stage reaction regime, the starting diisocyanates a), optionally containing the catalyst, are introduced, optionally under inert gas—such as nitrogen, for example—and optionally in the presence of a suitable solvent of the stated type, in general at temperatures optimum for the thioallophanatization, in the range from 60 to 140° C., preferably 70 to 120° C., and are reacted with the silane component b), optionally containing the catalyst.

An alternative option is to add the catalyst to the reaction mixture at any desired point in time during the thiourethanization reaction. In the case of this embodiment of the process for preparing the thioallophanates containing silane groups, the temperature set for the pure thiourethanization reaction, which proceeds before the addition of catalyst, is generally in the range from 30 to 120° C., preferably from 50 to 100° C. Following addition of a suitable catalyst, finally, the thioallophantization reaction is carried out at temperatures of 60 to 140° C., preferably of 70 to 120° C.

In the case of the preparation of the thioallophanates containing silane groups, the course of the reaction may be monitored by, for example, titrimetic determination of the NCO content. When the target NCO content has been reached, preferably when the degree of thioallophanatization (i.e., the percentage fraction, as computable from the NCO content, of the thiourethane groups which have formed as intermediates from the mercapto groups of component b) and have undergone reaction to form thioallophanate groups) of the reaction mixture is at least 70%, more preferably at least 90%, and very preferably after complete thioallophanatization, the reaction is discontinued. In the case of a purely thermal reaction regime, this may be accomplished, for example, by cooling the reaction mixture to room temperature. In the case of the preferred accompanying use of a thioallophanatization catalyst of the type stated, however, the reaction is generally stopped by addition of suitable catalyst poisons, examples being acyl chlorides, such as benzoyl chloride or isophthaloyl dichloride.

The reaction mixture is preferably then freed by thin-film distillation under a high vacuum, as for example at a pressure below 1.0 mbar, preferably below 0.5 mbar, more preferably below 0.2 mbar, under very gentle conditions, as for example at a temperature of 100 to 200° C., preferably of 120 to 180° C., from volatile constituents (excess monomeric diisocyanates, solvents optionally used, and, when no catalyst poison is being used, any active catalyst).

The distillates obtained, which as well as the unreacted monomeric starting diisocyanates comprise any solvents used, where no catalyst poison is used, any active catalyst, can be used readily for renewed oligomerization.

In another embodiment of the process for preparing the thioallophanates containing silane groups, the stated volatile constituents are removed from the oligomerization product by extraction with suitable solvents that are inert towards isocyanate groups, examples being aliphatic or cycloaliphatic hydrocarbons such as pentane, hexane, heptane, cyclopentane or cyclohexane.

Irrespective of the type of working up, the resulting products are clear, virtually colourless thioallophanate polyisocyanates, with colour numbers generally of less than 120 APHA, preferably of below 80 APHA, more preferably of below 60 APHA, and with an NCO content of 2.0 to 18.0 wt %, preferably 7.0 to 17.0 wt %, more preferably 10.0 to 16.0 wt %. The average NCO functionality, depending on the degree of conversion and thioallophanatization catalyst used, is generally from 1.8 to 3.0, preferably from 1.8 to 2.5, more preferably from 1.9 to 2.1.

Besides the thioallophanate polyisocyanates, the polyisocyanate component A) may optionally further comprise polyisocyanates having aliphatically, cycloaliphatically, araliphatically and/or aromatically bonded isocyanate groups, which may optionally also already have silane groups. These further polyisocyanates are, in particular, the known paint isocyanates with uretdione, isocyanurate, iminooxadiazinedione, urethane, allophanate, biuret and/or oxadiazinetrione structure, as described by way of example in Laas et al., *J. Prakt. Chem.* 336, 1994, 185-200, in DE-A 1 670 666, DE A 3 700 209, DE-A 3 900 053, EP-A 0 330 966, EP-A 0 336 205, EP-A 0 339 396 and EP-A 0 798 299, and also reaction products of such polyisocyanates with compounds that contain silane groups and are reactive towards isocyanate groups, as described for example in EP-A 1 273 640, WO 2014/086530 or WO 2009/156148.

Preferred further polyisocyanates which in addition to the thioallophanates containing silane groups may optionally be present in the polyisocyanate component A), in addition, are any desired hydrophilically modified polyisocyanates whose accompanying use may make it easier, for example, to incorporate the polyisocyanate component into the aqueous polymer dispersion B). Hydrophilically modified polyisocyanates suitable for this purpose are, for example, reaction products of the aforementioned paint polyisocyanates with hydrophilic polyether alcohols, of the kind described for example in EP-A 0 206 059 and EP-A 0 540 985, EP-A 0 959 087, EP-A 0 486 881 and WO 2005/047357, reaction products with aminosulphonic acids, of the kind described for example in WO 01/88006 or WO 2015/0035673, or the blends, known for example from WO 97/31960, of polyisocyanates of this kind with alkylphenol polyglycol ether phosphates and/or phosphonates or with fatty alcohol polyglycol ether phosphates and/or phosphonates, each present in a form neutralized with tertiary amines.

Particularly preferred further polyisocyanates which may be present optionally in the polyisocyanate component A) in addition to the thioallophanates containing silane groups are those of the type stated having exclusively aliphatically and/or cycloaliphatically bonded isocyanate groups, more particularly those based on PDI, HDI and/or IPDI.

If at all, in the coating compositions of the invention, these further polyisocyanates are used in the polyisocyanate component A) in amounts of up to 70 wt %, preferably up to 60 wt %, more preferably up to 50 wt %, based on the total amount of the polyisocyanate component A), consisting of at least one thioallophanate containing silane groups and optionally of further polyisocyanates.

In the blends which are present when further polyisocyanates of the stated kind are used accompanyingly as polyisocyanate components A), the very low viscosity of the thioallophanate polyisocyanates containing silane groups causes them to take on the role of a reactive diluent for the paint polyisocyanates, which are generally of higher viscosity. Relative to the existing, prior-art silane-functional polyisocyanates, for comparable silane contents, these blends of thioallophanate polyisocyanates containing silane groups with other polyisocyanates exhibit the advantage of considerably higher isocyanate contents and isocyanate functionalities in conjunction with much lower viscosities.

The coating compositions of the invention comprise as a binder component any desired aqueous polymer dispersions B) which preferably carry groups that are reactive toward isocyanate groups, more preferably hydroxyl groups and/or amino groups.

Suitable aqueous polymer dispersions B) are all polymer dispersions which are customary within aqueous 2K PU coatings technology. They are, for example, the customary aqueous or water-dispersible polyacrylate resins, polyester resins, polyurethane resins, polyurea resins, polycarbonate resins or polyether resins, of the kind described for example in EP-A 0 358 979, EP-A 0 469 389, EP-A 0 496 205, EP-A 0 557 844, EP-A 0 583 728, WO 94/03511, WO 94/20559, WO 94/28043 or WO 95/02005. Also possible is the use of any desired hybrid dispersions or any desired mixtures of different polymer dispersions.

Examples of suitable hydroxy-functional polyacrylate dispersions $B_1$) are the known so-called secondary polyacrylate dispersions which are preparable in a manner known per se by copolymerization of olefinically unsaturated monomers having hydroxyl groups with hydroxyl-free olefinic monomers in organic solvents, neutralization of potentially ionic groups incorporated, and dispersion in water.

Examples of suitable monomers for preparing the secondary polyacrylate dispersions $B_1$) are, for example, vinyl and vinylidene monomers such as, for example, styrene, α-methylstyrene, o- and/or p-chlorostyrene, o-, m- or p-methylstyrene, p-tert-butylstyrene, acrylic acid, acrylonitrile, methacrylonitrile, acrylic and methacrylic esters of alcohols having up to 18 carbon atoms, such as methyl acrylate, ethyl acrylate, n-propyl acrylate, isopropyl acrylate, n-butyl acrylate, isobutyl acrylate, tert-butyl acrylate, amyl acrylate, hexyl acrylate, 2-ethylhexyl acrylate, isooctyl acrylate, 3,3,5-trimethylhexyl acrylate, stearyl acrylate, lauryl acrylate, cyclopentyl acrylate, cyclohexyl acrylate, 4-tert-butycyclohexyl acrylate, norbornyl acrylate, isobornyl acrylate, methyl methacrylate, ethyl methacrylate, n-propyl methacrylate, isopropyl methacrylate, butyl methacrylate, isobutyl methacrylate, tert-butyl methacrylate, amyl methacrylate, hexyl methacrylate, 2-ethylhexyl methacrylate, isooctyl methacrylate, 3,3,5-trimethylhexyl methacrylate, stearyl methacrylate, lauryl methacrylate, cyclopentyl methacrylate, cyclohexyl methacrylate, 4-tert-butycyclohexyl methacrylate, norbornyl methacrylate or isobornyl methacrylate, diesters of fumaric acid, itaconic acid or maleic acid with alcohols having 4 to 8 carbon atoms, acrylamide, methacrylamide, vinyl esters of alkane monocarboxylic acids having 2 to 5 carbon atoms, such as vinyl acetate or vinyl propionate, carboxy-functional radically polymerized monomers, such as acrylic acid, methacrylic acid, β-carboxyethyl acrylate, crotonic acid, fumaric acid, maleic acid (anhydride), itaconic acid, or monoalkyl esters of dibasic acids and/or anhydrides, such as monoalkyl maleates, hydroxyalkyl esters of acrylic acid and methacrylic acid having 2 to 6 carbon atoms in the hydroxyalkyl radical, such as 2-hydroxyethyl, 2-hydroxypropyl, 3-hydroxypropyl, 3-hydroxybutyl, 4-hydroxybutyl, trimethylolpropane mono- or pentaerythritol mono-acrylate or methacrylate, hydroxyl monomers containing alkylene oxide units, such as adducts of ethylene oxide, propylene oxide or butylene oxide with acrylic acid or methacrylic acid, for example, and also any desired mixtures of such monomers stated by way of example.

Further, likewise suitable olefinically unsaturated monomers for preparing the secondary polyacrylate dispersions $B_1$) are vinyl monomers containing alkylene oxide units, such as condensation products of acrylic acid or methacrylic acid with oligoalkylene oxide monoalkyl ethers, and also monomers having further functional groups, such as epoxy groups, alkoxysilyl groups, urea groups, urethane groups, amide groups or nitrile groups, for example, and also (meth)acrylate monomers and/or vinyl monomers having functionality of two or more, such as hexanediol di(meth) acrylate, for example, which can be used accompanyingly in minor amounts of, for example, up to 3 wt %, based on the sum of the monomers.

Preferred olefinically unsaturated monomers for preparing secondary polyacrylate dispersions $B_1$) are methyl methacrylate, styrene, acrylic acid, methacrylic acid, butyl acrylate, butyl methacrylate, ethyl acrylate, tert-butyl acrylate, 2-ethylhexyl acrylate, 2-ethylhexyl methacrylate, hydroxyethyl methacrylate, hydroxypropyl methacrylate, hydroxyethyl acrylate, hydroxypropyl acrylate, hydroxybutyl acrylate or hydroxybutyl methacrylate.

In the secondary polyacrylate dispersions $B_1$) the amount of carboxy-functional monomers is between 0.8 and 5 wt %, particularly 1.2 to 4 wt %, and the amount of hydroxy-functional monomers is between 1 and 45 wt %, preferably 6 to 30 wt %.

The secondary polyacrylate dispersions $B_1$) suitable for the coating compositions of the invention are prepared from the olefinically unsaturated monomers in the presence of polymerization initiators which are known per se. Examples of suitable initiators are peroxy compounds such as diacyl peroxides, alkyl peresters, dialkyl peroxides, peroxydicarbonates, inorganic peroxides or else azo compounds.

Suitable in principle are any desired organic solvents for preparing the secondary polyacrylate dispersions $B_1$). These solvents can be used in any desired amounts, but preferably in amounts of less than 20 wt %, based on the sum total of monomers. Preferred are solvent mixtures of at least one hydrophobic solvent, such as solvent naphtha, toluene, xylene, Kristalloel, and at least one hydrophilic solvent such as butyl glycol, butyl diglycol, diethylene glycol, propylene glycol monomethyl ether or dipropylene glycol monomethyl ether.

The potentially ionic groups, especially carboxyl groups, that are incorporated in the copolymer are neutralized customarily using suitable tertiary amines. Examples of suitable neutralizing amines are tertiary monoamines, such as trimethylamine, triethylamine, tripropylamine, tributylamine, ethyldiisopropylamine, dimethylcyclohexylamine, N-methylmorpholine, N-ethylmorpholine, N-methylpiperidine, N-ethylpiperidine, tertiary diamines, such as 1,3-bis(dimethylamino)propane, 1,4-bis(dimethylamino)butane or N,N'-dimethylpiperazine, or else tertiary amines that carry groups reactive towards isocyanates, examples being alkanolamines, such as dimethylethanolamine, methyldiethanolamine, 2-aminomethyl-2-methylpropanol or triethanolamine, for example.

The secondary polyacrylate dispersions $B_1$) may be prepared by any known prior-art processes, in a feed process, batch process or in cascade processes, for example.

After the copolymer solution has been dispersed in water, the solvent used may be removed proportionally or entirely by distillation.

The pH of the secondary polyacrylate dispersions $B_1$) suitable for the coating compositions of the invention is preferably between 5 and 11, more preferably between 6 and 10.

The solids contents of the secondary polyacrylate dispersions $B_1$) are preferably between 20 and 60 wt %, more preferably between 35 and 55 wt %, and the average particle sizes are generally between 20 and 400 nm.

In the preparation of the secondary polyacrylate dispersions, reactive diluents, as they are called, may be used either instead of or together with the solvents. Suitable reactive diluents are, for example, polyethers with a functionality of two and/or three that are liquid at room temperature, low-viscosity polyesters such as reaction products of 1 mol of a dicarboxylic acid, such as dimer fatty acids or adipic acid, with 2 mols of a diol or triol or with 2 mols of the glycidyl ester of Versatic acid. Examples of further suitable reactive diluents include reaction products of e-caprolactone with low molecular weight alcohols, and also hydroxy-functional oils, such as castor oil.

Suitable aqueous polymer dispersions B) for the coating compositions of the invention are also, for example, what are called hydroxy-functional primary polyacrylate dispersions $B_2$), which can be prepared in a conventional way by copolymerization of olefinically unsaturated monomers having hydroxyl groups with olefinic monomers that are free from hydroxyl groups, directly in aqueous emulsion, in the presence of suitable surface-active substances.

Suitable primary polyacrylate dispersions $B_2$) and their preparation are described for example in R. O. Athey jr., Emulsion Polymer Technology, Dekker, New York, 1991.

Monomers suitable for preparing such primary polyacrylate dispersions $B_2$) include in principle the monomers already stated above in connection with the preparation of the secondary polyacrylate dispersions $B_1$).

Primary polyacrylate dispersions $B_2$) are prepared in the presence of suitable surface-active substances. These are the ionic and/or non-ionic emulsifiers that are known per se.

Ionic emulsifiers, for example, are those which carry carboxylate groups or, preferably, sulphate, sulphonate, phosphate or phosphonate groups. Particularly preferred ionic emulsifiers are those which are composed of long-chain alcohols or substituted phenols and also ethylene oxide chains with degrees of polymerization between 2 and 100 and a concluding sulphuric monoester group or concluding phosphoric monoester and diester groups, and which are neutralized preferably with ammonia. They can be added to the emulsion batch individually or in any desired mixtures.

Nonionic emulsifiers, which are used usually in combination with the aforementioned anionic emulsifiers, are exemplified by reaction products of carboxylic acids, alcohols, phenol derivatives and/or amines with epoxides, such as ethylene oxide. Suitable non-ionic emulsifiers are, for example, oligoethers and polyethers prepared by reaction of ethylene oxide with carboxylic acids, such as lauric acid, stearic acid, oleic acid, the carboxylic acids of castor oil, or abietic acid, with relatively long-chain alcohols, such as oleyl alcohol, lauryl alcohol or stearyl alcohol, with phenol derivatives, such as substituted benzyl phenyls, phenylphenols or nonylphenols, or with relatively long-chain amines, such as dodecylamine or stearylamine, having degrees of polymerization between 2 and 100, preferably from 5 to 50.

In the preparation of primary polyacrylate dispersions $B_2$), emulsifiers of the type stated are added preferably in amounts of 0.1 to 10 wt %, based on the amount of unsaturated monomers used.

In the emulsion polymerization, the polymerization initiators generally are either introduced in the initial charge and/or added in parallel, including, where appropriate, their addition with advance feed or delayed feed and/or extended feed. Examples of suitable initiators are redox systems, peroxides, persulphates and/or azo compounds, such as dibenzoyl peroxide, dicumene peroxide, cumene hydroperoxide, potassium peroxodisulphate, ammonium peroxodisulphate, azobisisobutyronitrile or di-tert-butyl peroxide.

Likewise suitable as aqueous polymer dispersions B) for the coating compositions of the invention are the hybrid forms, known per se, of polyacrylate dispersions, such as polyester-polyacrylate dispersions $B_3$), for example. These dispersions contain both polyacrylate segments and polyester segments and are prepared for example by radical (co) polymerization of monomers of the type stated above, in connection with the preparation of secondary polyacrylate dispersions $B_1$), in the presence of a polyester component, a reaction which can be carried out in bulk or, preferably, in organic solution. Suitable polyester components are described below as possible synthesis components for the preparation of polyurethane dispersions $B_4$).

Polyester-polyacrylate dispersions $B_3$) suitable as aqueous polymer dispersions B) preferably contain a polyester fraction of 10 to 75 wt %, more preferably of 20 to 60 wt %, based on the total solids content of the dispersion.

Also suitable as aqueous polymer dispersions B) for the coating compositions of the invention are polyurethane dispersions $B_4$). These dispersions are the generally self-emulsifying polyurethanes or polyurethane-polyureas, that are known per se, in aqueous form.

Self-emulsifying polyurethanes contain ionic and/or non-ionic hydrophilic groups in the polymer chain, it being possible for these groups to be incorporated either directly in the polymer chain or else pendently or terminally.

Suitable polyurethane dispersions $B_4$) may be attained by methods known to the skilled person, by preparing a polyurethane or a polyurethane prepolymer in the melt or in organic solution and then dispersing it in water, it being possible optionally for a chain extension reaction for increasing molecular weight to be carried out in organic solution, in parallel with the dispersing step or after the dispersing step.

In the preparation of suitable polyurethane dispersions $B_4$), the incorporation of hydrophilic groups into the polyurethane may take place using different compounds reactive towards isocyanate groups and having potentially ionic and/or non-ionic, as for example by incorporation of hydroxycarboxylic acids, such as dimethylolacetic acid, 2,2-dimethylolpropionic acid, 2,2-dimethylbutyric acid, 2,2-dimethylolpentanoic acid, dihydroxysuccinic acid, hydroxypivalinic acid or mixtures of such acids, aminocarboxylic acids, such as the Michael adducts of isophoronediamine or ethylenediamine on acrylic acid, aminosulphonic acids, such as aminoethylethanesulphonic acid, hydroxy- or amino-functional phosphonic acids and/or mono, di- or trifunctional polyethylene oxide units of the molecular weight range 350 to 2500 g/mol, the use of mixtures of such compounds is also a possibility.

Particularly suitable hydrophilic units are dimethylolpropionoic acid, dimethylolbutyric acid, mono- or dihydroxy-functional polyethylene oxide units of the above-stated molecular weight range, and also hydroxy-functional or amino-functional sulphonic acids and/or sulphonates.

Serving as neutralizing agents of these hydrophilic units, preferably, are tertiary amines and/or tertiary amino alcohols, as described above as neutralizing amines for suitable secondary polyacrylate dispersions $B_1$).

Suitable polyurethane dispersions $B_4$) are prepared using any desired aliphatic, cycloaliphatic, araliphatic and/or aromatic di- and/or polyisocyanates, of the kind stated for example already above as starting compounds for preparing the thioallophanates of component A) that contain silane groups.

Preferred is the use of isophorone diisocyanate, 4,4'-diisocyanato-dicyclohexylmethane and/or hexamethylene diisocyanate.

Further synthesis components for preparing suitable polyurethane dispersions $B_4$) are polyester, polyesteramide, polyacetal, polyether, polysiloxane and/or polycarbonate polyols of the molecular weight range 500 to 18 000 g/mol with a functionality of 1 to 5, preferably of 2 to 2.5.

Suitable polyester polyols for preparing polyurethane dispersions $B_4$) are, for example, those having an average functionality of 1.5 to 5, as are preparable in the known way by the reaction of aliphatic, cycloaliphatic or aromatic dicarboxylic and/or polycarboxylic acids and/or their anhydrides, such as succinic acid, glutaric acid, adipic acid, sebacic acid, pimelic acid, subic acid, azelaic acid, nonanedicarboxylic acid, decanedicarboxylic acid, phthalic acid, isophthalic acid, hexahydrophthalic acid, trimellitic acid, phthalic anhydride, tetrahydrophthalic acid, maleic acid, maleic anhydride, fumaric acid, dimeric and trimeric fatty acids, dimethyl terephthalate and bisglycol terephthalate, for example, with polyhydric alcohols, such as 1,2-ethanediol, 1,2- and 1,3-propanediol, the isomeric butanediols, pentanediols, hexanediols, heptanediols and octanediols, 1,10-decanediol, 1,12-dodecanediol, 1,2- and 1,4-cyclohexanediol, 1,4-cyclohexanedimethanol, 4,4'-(1-methylethylidene)biscyclohexanol, diethylene glycol, triethylene glycol, tetraethylene glycol, 1,2-propanediol, dipropylene glycol, tripropylene glycol, tetrapropylene glycol, 1,2,3-propanetriol, 1,1,1-trimethylolethane, 1,2,6-hexanetriol, 1,1,1-trimethylolpropane, 2,2-bis(hydroxymethyl)-1,3-propanediol and/or 1,3,5-tris(2-hydroxyethyl) isocyanurate, for example.

Suitable polyester polyols are, for example, also those of the kind preparable in a conventional way from lactones and single polyhydric alcohols, such as those exemplified above, for example, as starter molecules, with ring opening. Examples of suitable lactones for preparing these polyester polyols are β-propiolactone, γ-butyrolactone, γ- and δ-valerolactone, ε-caprolactone, 3,5,5- and 3,3,5-trimethylcaprolactone or any desired mixtures of such lactones.

Suitable polycarbonate polyols for preparing polyurethane dispersions $B_4$) are, in particular, the reaction products, known per se, of dihydric alcohols, as for example those as stated above by way of example in the list of the polyhydric alcohols, with diaryl carbonates, such as diphenyl carbonate, dimethyl carbonate or phosgene, for example. Further suitable polycarbonate polyols are those which as well as carbonate structures additionally contain ester groups. These are, in particular, the polyestercarbonate diols, known per se, of the kind obtainable, for example, by the teaching of DE-B 1 770 245 by reaction of dihydric alcohols with lactones, such as E-caprolactone, in particular, and subsequent reaction of the resultant polyester diols with diphenyl or dimethyl carbonate. Polycarbonate polyols likewise suitable are those which in addition to carbonate structures contain ether groups. These are, in particular, the polyethercarbonate polyols known per se, of the kind obtainable for example by the method of EP-A 2046861 by catalytic reaction of alkylene oxides and carbon dioxide in the presence of H-functional starter molecules.

Suitable polyetherpolyols for preparing polyurethane dispersions $B_4$) are, for example, those as obtainable in a manner known per se by alkoxylation of suitable starter molecules. To prepare these polyether polyols it is possible to use as starter molecules any desired polyhydric alcohols, examples being those from the molecular weight range of 62 to 400, of the kind described above with regard to the preparation of polyester polyols. Alkylene oxides suitable for the alkoxylation reaction are especially ethylene oxide and propylene oxide, which can be used in the alkoxylation reaction in any sequence or else in a mixture. Further, likewise suitable polyether polyols are the polytetramethylene ether glycols which are obtainable for example as per Angew. Chem. 72, 927 (1960) by polymerization of tetrahydrofuran, and which have number-average molecular weights of 400 g/mol to 4000 g/mol.

To prepare suitable polyurethane dispersions $B_4$), in addition, it is also possible to use block copolymers based on the stated polyols, examples being polyether/polyester copolymers, polycarbonate/polyester copolymers or polycarbonate/polyether copolymers.

Preferred polyols for preparing suitable polyurethane dispersions $B_4$) are polyester polyols, polycarbonate polyols and/or C3 and/or C4 polyether polyols.

When preparing suitable polyurethane dispersions $B_4$) it is also possible optionally to use low molecular alcohols with a functionality of 2 to 4. These are, in particular, compounds with a molecular weight <500 g/mol, examples being the simple polyhydric alcohols of the type stated above as synthesis components for polyester polyols, or amino alcohols, such as diethanolamine, ethanolamine, diisopropanolamine, propanolamine, for example, which optionally may also be present in ethoxylated and/or propoxylated form, and also any desired mixtures of such alcohols.

Generally speaking, compounds known as chain extenders are used when preparing suitable polyurethane dispersions $B_4$). These chain extenders are, in particular, diamines, polyamines and/or amino alcohols, such as diethanolamine, 1,2-diaminopropane, 1,4-diaminobutane, 2,5-diamino-2,5-dimethylhexane, 1,5-diamino-2-methylpentane, 1,6-diaminohexane, 2,2,4- and/or 2,4,4-trimethyl-1,6-diaminohexane, 1,11-diaminoundecane, 1,12-diaminododecane, triaminononane, ethylenediamine, isophoronediamine, diethylenetriamine, hydrazine, adipic dihydrazide, hydroxyethylethylenediamine, bishydroxyethylethylenediamine, aminopropanol, aminoalkoxysilanes, and any desired mixtures of such compounds.

Suitable polyurethane dispersions $B_4$) can be prepared using suitable solvents. Examples of suitable solvents are acetone, methyl ethyl ketone, N-methylpynrolidone and/or N-ethylpyrrolidone.

Suitable polyurethane dispersions $B_4$) can be prepared to accelerate the reaction or to achieve specific effects, including with use of catalysts customary in polyurethane chemistry, such as dibutyltin dilaurate, dibutyltin oxide, tin dioctoate, tin chloride and/or tertiary amines.

Usually, in preparation of the polyurethane dispersions in melt or organic solution, diisocyanates and/or polyisocyanates are reacted with polyols and hydrophilic units of the type stated to form an isocyanate-functional prepolymer, which is then reacted further, either in the melt, in organic solution or in aqueous dispersion, with chain extender of the type stated to form a high molecular weight polyurethane which is dispersible and/or dispersed in water.

Any solvent used can optionally be removed by distillation, in whole or in part, following the dispersal.

Suitable polyurethane dispersions $B_4$) for the coating compositions of the invention preferably have solids contents of 25 to 60 wt %, pH values of 5.5 to 11 and average particle sizes of 20 to 500 nm.

Further suitable aqueous polymer dispersions B) for the coating compositions of the invention are polyester dispersions and polyester solutions $B_5$), as obtained by dispersing suitable water-dilutable polyester polyols in water.

Examples of suitable water-dilutable polyester polyols are the dispersing resins that are known for example from paint technology and which possess very good pigment wetting and/or pigment affinity qualities and have acid numbers in the range from 25 to 75 mg KOH/g, hydroxyl group contents of 2.5 to 10 wt %, molecular weights in the range from 750 to 5000 g/mol, and fatty acid constituents in amounts of 15 to 50 wt %.

Suitable polyester dispersions and solutions $B_5$) for the coating compositions of the invention are obtained, for example, by reacting polyester polyols, examples being those as described above as synthesis components for preparing polyurethane dispersions $B_4$), with acid anhydrides, such as phthalic anhydride, hexahydrophthalic anhydride, tetrahydrophthalic anhydride, maleic anhydride, trimellitic anhydride or pyromellitic anhydride, for example, the reaction being carried out such that the acid anhydrides react with a proportion of the hydroxyl groups, with ring opening of the anhydride and incorporation into the polyester. In this way, hydroxy-functional and at the same time carboxy-functional polyesters are obtained which, following complete or proportional neutralization of the carboxyl groups, can be dissolved or dispersed in water. This produces aqueous polyester dispersions or solutions $B_5$) having average particle sizes of 10 to 200, preferably of 25 to 100 nm.

Generally speaking, the aqueous polymer dispersions B) that are used in the coating compositions of the invention are dispersions of the stated kind which are hydroxy-functional and/or amino-functional. Also possible, however, is the use of non-functional polymer dispersions B) as a binder component in the coating compositions of the invention.

The aqueous polymer dispersion B) used in the coating compositions of the invention preferably comprises at least one aqueous secondary polyacrylate dispersion $B_1$), a polyester-polyacrylate dispersion $B_3$) and/or a polyurethane dispersion $B_4$) based on polyester polyols, polycarbonate polyols and/or $C_3$- or $C_4$-polyether polyols.

Used with preference in the coating compositions of the invention are hydroxy-functional aqueous polymer dispersions B) which, based on resin solids, have a hydroxyl groups content of 0.5 to 7.0 wt %, preferably 0.5 to 6.0 wt %, more preferably of 1.0 to 5.0 wt %, acid numbers of less than 50 mg KOH/g, preferably less than 40 mg KOH/g, more preferably less than 30 mg KOH/g, and number-average molecular weights $M_n$ as determinable by gel permeation chromatography, of 500 to 30 000, preferably 1000 to 15 000, more preferably of 1500 to 10 000.

The coating compositions of the invention optionally comprise at least one catalyst C) for the crosslinking of silane groups. Catalysts of this kind are any compounds which are capable of accelerating the hydrolysis and condensation of alkoxysilane groups.

Examples of suitable catalysts C) are acids, such as organic carboxylic acids, sulphuric acid, p-toluenesulphonic acid, trifluoromethanesulphonic acid, dodecylbenzenesulphonic acid, trifluoroacetic acid, phosphoric monoesters and phosphoric diesters, such as dibutyl phosphate, 2-ethylhexyl phosphate, phenyl phosphate and bis(2-ethylhexyl) phosphate, and also phosphonic diesters and diphosphonic diesters, as described in WO 2007/033786, for example.

Likewise suitable as catalysts C) are also bases, such as the N-substituted amidines 1,5-diazabicyclo[4.3.0]non-5-ene (DBN) and 1,5-diazabicyclo[5.4.0]undec-7-ene (DBU), or else metal salts and metal chelates, such as tetraisopropyl titanate, tetrabutyl titanate, titanium(IV) acetylacetonate, aluminium tri-sec-butoxide, aluminium acetylacetonate, aluminium triflate, tin triflate or zirconium ethylacetoacetate, as described in WO 2006/042658, for example.

Other suitable catalysts C) are phosphoric esters and phosphonic esters of the type stated above that are present in the form blocked with amines, preferably with tertiary amines. Particularly preferred catalysts of this type are those which release the acidic phosphoric and phosphonic esters again in the temperature range from 100 to 150° C., with elimination of the blocking amine, said esters representing the actually active catalysts. Suitable amine-blocked phosphoric acid catalysts C) are described in WO 2008/074489 and WO 2009/077180, for example.

Likewise suitable catalysts C) are organic sulphonic acids of the type stated above which are used in blocked form, for example in amine-neutralized form, or as adduct with epoxides, as described in DE 2 356 768 B1, and which release the catalytic sulphonic acids again above 100° C.

Further catalysts C) suitable for the crosslinking of silane groups are also tetraalkylammonium carboxylates, such as, for example, tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and/or tetrabutylammonium benzoate.

Catalysts C) suitable for the crosslinking of silane groups are also quaternary ammonium and phosphonium polyfluorides, as known as trimerization catalysts for isocyanate groups from EP-A0 798 299, EP-A0 896 009 and EP-A0 962 455, for example.

Lastly, suitable catalysts C) are also zinc-amidine complexes, which are preparable by the process of WO 2014/016019 by reaction of one or more zinc(II) biscarboxylates with amidines.

Preferred catalysts C) for the crosslinking of silane groups are acidic phosphoric esters, phosphonic esters and sulphonic esters of the stated type, which may optionally be present in a form blocked with amines, and also tetraalkylammonium carboxylates of the stated type. Particularly preferred catalysts C) are amine-blocked phosphoric esters and sulphonic acids, and also the stated tetraalkylammonium carboxylates. Especially preferred catalysts C) are amine-blocked phenyl phosphate and bis(2-ethylhexyl) phosphate, tetraethylammonium benzoate and tetrabutylammonium benzoate.

Besides the catalysts C) identified by way of example above for silane crosslinking, the coating compositions of the invention may optionally further comprise urethanization catalysts which are customary in isocyanate chemistry and which accelerate the reaction of the isocyanate groups in component A) with the hydroxyl groups in the binder component B), examples of such catalysts being tertiary amines such as triethylamine, pyridine, methylpyridine, benzyldimethylamine, N,N-endoethylenepiperazine, N-methylpiperidine, pentamethyldiethylenetriamine, N,N-dimethylaminocyclohexane, N,N'-dimethylpiperazine or metal salts such as iron(III) chloride, zinc chloride, zinc 2-ethylcaproate, tin(II) octanoate, tin(II) ethylcaproate, dibutyltin(IV) dilaurate, zirconium(IV) isopropoxide, zirconium(IV) n-butoxide, zirconium(IV) 2-ethylhexanoate, zirconyl octanoate, bismuth(III) 2-ethylhexanoate, bismuth (III) octoate, molybdenum glycolate and/or lithium molybdate.

The catalysts C) are optionally employed in the coating compositions of the invention as an individual substance or in the form of any desired mixtures with one another, in amounts of up to 5 wt %, preferably up to 2 wt %, more preferably up to 1 wt %, calculated as the sum of all the catalysts C) used and based on the total amount of solids content of polyisocyanate component A) and hydroxy-functional binder component B).

The coating compositions of the invention may optionally comprise further auxiliaries and additives D). These are in particular the auxiliaries and additives known to the skilled person from aqueous coatings technology, such as, for example, solvents, UV stabilizers, antioxidants, flow control agents, rheological additives, slip additives, defoamers, dispersing assistants, thickeners, emulsifiers, dyes, matting agents, flame retardants, hydrolysis inhibitors, microbicides, algicides, water scavengers, thixotropic agents, wetting agents, deaerating agents, adhesion promoters, fillers and/or pigments.

Organic solvents $D_1$) for example may be added to the coating compositions of the invention, examples being the paint solvents described above as solvents for optional use in the preparation of the thioallophanates containing silane groups. As solvents which are to be added to the polyisocyanate component A) for the purpose for example of further reducing the viscosity and facilitating incorporation into the aqueous phase, suitable solvents are preferably those which are chemically inert with respect to the isocyanate groups and silane groups in the polyisocyanate component A), and which have a water content of at most 1.0 wt %, more preferably at most 0.5 wt %, based on solvent used.

Suitable UV stabilizers $D_2$) may be selected preferably from the group consisting of piperidine derivatives, such as, for example, 4-benzoyloxy-2,2,6,6-tetramethylpiperidine, 4-benzoyloxy-1,2,2,6,6-pentamethylpiperidine, bis(2,2,6,6-tetramethyl-4-piperidyl) sebacate, bis(1,2,2,6,6-pentamethyl-1-4-piperidyl) sebacate, bis(2,2,6,6-tetramethyl-4-piperidyl) suberate, bis(2,2,6,6-tetramethyl-4-piperidyl) dodecanedioate; benzophenone derivatives, such as 2,4-dihydroxy-, 2-hydroxy-4-methoxy-, 2-hydroxy-4-octoxy-, 2-hydroxy-4-dodecyloxy- or 2,2'-dihydroxy-4-dodecyloxy-benzophenone; benzotriazole derivatives, such as 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4,6-bis(1-methyl-1-phenylethyl)phenol, 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl)phenol, isooctyl 3-(3-(2H-benzotriazol-2-yl)-5-(1,1-dimethylethyl)-4-hydroxyphenylpropionate), 2-(2H-benzotriazol-2-yl)-4,6-bis(1,1-dimethylethyl)phenol, 2-(2H-benzotriazol-2-yl)-4,6-bis(1-methyl-1-phenylethyl)phenol, 2-(5-chloro-2H-benzotriazol-2-yl)-4,6-bis(1,1-dimethylethyl)phenol; oxalanilides, such as 2-ethyl-2'-ethoxy- or 4-methyl-4'-methoxyoxalanilide; salicylic esters, such as phenyl salicylate, 4-tert-butylphenyl salicylate, 4-tert-octylphenyl salicylate; cinnamic ester derivatives, such as methyl α-cyano-β-methyl-4-methoxycinnamate, butyl α-cyano-β-methyl-4-methoxycinnamate, ethyl α-cyano-β-phenylcinnamate, isooctyl α-cyano-β-phenylcinnamate; and malonic ester derivatives, such as dimethyl 4-methoxybenzylidenemalonate, diethyl 4-methoxybenzylidenemalonate, dimethyl 4-butoxybenzylidenemalonate. These preferred UV stabilizers may be used either individually or else in any combinations with one another.

Optionally, one or more of the exemplified UV stabilizers $D_2$) are added to the coating composition of the invention, preferably in amounts of 0.001 to 3.0 wt %, more preferably 0.01 to 2 wt %, calculated as total amount of UV stabilizers used, based on the total amount of solids content of the polyisocyanate component A) and aqueous polymer dispersion B).

Suitable antioxidants $D_3$) are preferably sterically hindered phenols, which may preferably be selected from the group consisting of 2,6-di-tert-butyl-4-methylphenol (ionol), pentaerythrityl tetrakis(3-(3,5-di-tert-butyl-4-hydroxyphenyl)propionate), octadecyl 3-(3,5-di-tert-butyl-4-hydroxyphenyl)propionate, triethylene glycol bis(3-tert-butyl-4-hydroxy-5-methylphenyl)propionate, 2,2'-thiobis(4-methyl-6-tert-butylphenol) and 2,2'-thiodiethyl bis[3-(3,5-di-tert-butyl-4-hydroxyphenyl)propionate]. If required, they can be used either individually or in any desired combinations with one another.

These antioxidants $D_3$) are used preferably in amounts of 0.01 to 3.0 wt %, more preferably 0.02 to 2.0 wt %, calculated as total amount of antioxidants used, based on the total amount of solids content of polyisocyanate component A) and aqueous polymer dispersion B).

In order to prevent premature crosslinking of silane groups in the coating compositions of the invention, there may be advantage to adding water scavengers $D_4$), examples being orthoformic esters, such as triethyl orthoformate, or vinylsilanes, such as vinyltrimethoxysilane, to the polyisocyanate component A). These water scavengers are employed, if at all, in amounts of up to 5 wt %, preferably up to 2 wt %, based on the polyisocyanate component A).

In order to improve the substrate wetting, the coating compositions of the invention may optionally comprise suitable flow control agents $D_5$), examples being organically modified siloxanes, such as polyether-modified siloxanes, polyacrylates and/or fluorosurfactants. These flow control agents are used if at all in amounts of up to 3 wt %, preferably up to 2 wt %, more preferably from 0.05 to 1.5 wt %, based on the total amount of solids content of polyisocyanate component A) and aqueous polymer dispersion B).

Examples of suitable fillers for the coating compositions of the invention include granulated stone or granulated plastic, glass beads, sand, cork, chalk or talc. Preferred fillers are chalk or talc. Examples of suitable pigments are titanium dioxide, zinc oxide, iron oxides, chromium oxides or carbon blacks. A comprehensive overview of suitable fillers and pigments D) is provided by "Lehrbuch der Lacke und Beschichtungen, Band II, Pigmente, Füllstoffe, Farbstoffe", Kittel, Verlag W. A. Colomb in der Heenemann GmbH, Berlin-Oberschwandorf, 1974, pp. 17-265. A preferred pigment used is titanium dioxide.

The fillers and pigments stated by way of example can be used, if at all, in amounts of up to 95 wt %, preferably up to 80 wt %, based on the total amount of solids content of polyisocyanate component A) and aqueous polymer dispersion B).

The rheological additives, slip additives, defoamers, dispersing assistants, thickeners, emulsifiers, dyes, matting agents, flame retardants, hydrolysis inhibitors, microbicides, algicides, thixotropic agents, wetting agents, deaerating agents, and/or adhesion promoters which are likewise optionally present in the coating compositions of the invention as further auxiliaries and additives D) are known to the skilled person and are employed if at all in amounts customary within coatings technology. A comprehensive overview of suitable auxiliaries and additives of this kind is found for example in Bodo MUiller, "Additive kompakt", Vincentz Network GmbH & Co KG (2009) or in "Lehrbuch der Lacke und Beschichtungen, Band III., Lösemittel, Weichmacher, Additive, Zwischenprodukte", H. Kittel, Verlag W. A. Colomb in der Heenemann GmbH, Berlin-Oberschwandorf, 1976, pp. 237-398.

The total amount of such further auxiliaries and additives D) is preferably up to 30 wt %, more preferably up to 20%, based on the total amount of solids content of polyisocyanate component A) and aqueous polymer dispersion B).

To prepare the aqueous coating compositions, the polyisocyanate component A) is emulsified in the aqueous polymer dispersion B). In this case, the polyisocyanate component A), which comprises at least one thioallophanate polyisocyanate containing silane groups, and the aqueous polymer dispersion B) are customarily used in amounts such that for each hydroxyl group and/or amino group of the polymer dispersion B) there are from 0.5 to 2.0, preferably from 0.6 to 1.8 and more preferably from 0.7 to 1.5 isocyanate groups of the polyisocyanate component A).

When using polymer dispersions B) that are non-functional, i.e. dispersions B) which carry no reactive groups relative to isocyanates, the polyisocyanate component A) will be used in general in amounts of up to 20 wt %, preferably up to 10 wt %, based on the total amount of the polyisocyanate component A) and polymer dispersion B).

The catalyst component C) for optional accompanying use, and also the further auxiliaries and additives D) for optional accompanying use, may be added here in any order, in succession or together, optionally even before the actual mixing of the reactive components, and may be added either to the polyisocyanate component A) and/or to the aqueous polymer dispersion B), in which case the catalyst component C) is added, with particular preference, to the polymer dispersion B) in order to avoid a premature silane condensation.

For preparing the aqueous coating compositions of the invention, the constituents A) to D) are mixed by means of customary dispersing technologies as for example by simple manual stirring or using suitable apparatus, such as rotor-stator systems, ultrasound technologies, bead mills or jet dispersers, for example.

Owing to the very low viscosity of the thioallophanates containing silane groups that are present in the polyisocyanate component A), and especially when further hydrophilic polyisocyanates are being used, simple emulsifying technologies, involving for example a mechanical stirrer, or even, often, simple mixing of the two components by hand, are generally enough to produce homogeneous coatings having very good properties.

The study on which the present patent application is based showed, surprisingly, that the coating compositions of the invention are outstandingly suitable for the production of coatings, such as paints, sealants and/or adhesives, for example. With the coating compositions of the invention, coatings can be produced that have significantly increased resistances towards mechanical scratching and effects of weathering, relative to known coatings. The resistance towards chemicals is comparable with the properties of existing coating compositions. The coating compositions of the invention therefore find use preferably in those fields of application where exacting requirements are imposed on a coating in terms of its optical quality and resistance to mechanical scratching.

A further embodiment of the present invention, accordingly, concerns the use of the coating compositions according to the invention for producing polyurethane paints and polyurethane coatings.

A further embodiment of the present invention relates to a method for coating surfaces, comprising the steps of
a) applying the coating composition to a substrate; and
b) curing the coating composition.

Applying the resultant coating compositions of the invention, which comprise as their crosslinking agents thioallophanate polyisocyanates containing silane groups, is done preferably by methods that are known per se, particularly preferably by spraying processes, such as compressed air spraying, airless spraying or electrostatic spraying, for example, using one-component or two-component spraying units, by spreading, rolling, dipping, flow coating, or using rolls or doctor blades, in one or more coats.

Preferred substrates for the coatings of the invention are metal, wood and wood-based materials, glass, stone, ceramic materials, mineral building materials, such as concrete, hard and flexible plastics, textiles, leather and paper. With particular preference, said substrates are provided prior to coating with customary, known primers, surfacers coatings, basecoat systems and/or clearcoat systems.

The coating compositions of the invention are preferably cured directly after application or after a defined flash-off time has been observed. The flash-off time is used, for example, for the flow and for the degassing of the coating films, or for the evaporation of volatile constituents, such as water and any solvents used. The required duration of the flash-off time may be specifically controlled by application, for example, of elevated temperatures and/or by a reduced atmospheric humidity.

The ultimate curing of the applied coating compositions of the invention takes place, finally, by customary known methods, either at ambient temperature or, for example, by heating in a forced circulation oven, by irradiation with IR lamps or near infrared (NIR radiation), preferably in a temperature range from 20 to 200° C., more preferably 30 to 190° C. and very preferably 50 to 180° C., for a time of 1 min up to 24 h, more preferably 2 min up to 12 h and very preferably 3 min to 8 h.

A further embodiment of the present invention relates to substrates which have been coated with one or more coating compositions of the invention.

The substrate is preferably selected from the group consisting of metal, wood, wood-based materials, glass, stone, ceramic materials, mineral building materials, hard and flexible plastics, textiles, leather and paper.

Coating takes place preferably by the method described in this patent specification.

The examples which follow illustrate the invention. They are not intended to restrict the scope of protection of the claims.

EXAMPLES

All percentages are based on weight, unless stated otherwise.

The NCO contents were determined by titrimetric means to DIN EN ISO 11909:2007-05.

The residual monomer contents were measured to DIN EN ISO 10283:2007-11 by gas chromatography with an internal standard.

All of the viscosity measurements took place with a PhysicAMCR 51 rheometer from Anton Paar Germany GmbH in accordance with DIN EN ISO 3219:1994-10 at a shearing rate of 250 1/s.

The amounts (mol %) of the isocyanate follow-on products—thiourethane, thioallophanate and isocyanurate—produced during the preparation of the thioallophanates containing silane groups (starting compounds A)) were computed from the integrals of proton-decoupled 13C NMR spectra (recorded on a Bruker DPX-400 instrument), and they relate in each case to the sum of thiourethane, thioallophanate and isocyanurate groups present. The chemical shifts (in ppm) of the individual structural elements are as follows: thiourethane: 166.8; thioallophanate: 172.3 and 152.8; isocyanurate: 148.4.

The gloss of the coatings obtained was measured using a BYK-Gardner micro-TRi-gloss reflectometer in accordance with DIN EN ISO 2813:1999-06 at angles of 20° and 60°.

The pendulum damping by the König method was determined in accordance with DIN EN ISO 1522:2007-04 on glass plates.

The wet scratch resistance of the coatings was tested using an Amtec-Kistler laboratory wash unit in accordance with DIN EN ISO 20566:2010-08, with subsequent determination of the residual gloss at 20° and 60°.

The resistance towards dry scratching was determined using a CM-5 crockmeter (from Atlas Electric Devices Co.) in accordance with DIN EN ISO 105-X12:2002-12 with 10 double rubs and an applied force of 9 N, using 9µ 281Q sandpaper (from 3M Deutschland GmbH), with subsequent determination of the residual gloss at 20° and 60°.

The figures for the wet scratching and dry scratching are expressed as % of residual gloss, measured immediately after scratching and also after reflow conditions, i.e. two-hour storage at 60° C., relative in each case to the initial gloss of the coating.

The accelerated weathering test was carried out according to DIN EN ISO 16474/2:2014-03 method A, cycle 1 (102:18) in a Ci5000 weathering ometer from (Atlas Material Testing Technology GmbH).

Preparation of the Starting Materials:
Polyisocyanate Component A1)

1008 g (6 mol) of hexamethylene diisocyanate (HDI) were introduced under dry nitrogen with stirring at a temperature of 80° C. and 196 g (1.0 mol) of mercaptopropyltrimethoxysilane were added over the course of 30 minutes. The reaction mixture was stirred further at 80° C. until, after about 6 hours, the NCO content of 38.4% was reached, corresponding to complete thiourethanization.

At this juncture the reaction mixture was sampled and the composition of the sample was determined by $^{13}$C-NMR spectroscopy. According to this analysis, thiourethane groups were present exclusively. The $^{13}$C-NMR spectrum showed no signals of thioallophanate or isocyanurate groups.

By addition of 0.1 g of zinc(II) 2-ethyl-1-hexanoate as catalyst to the reaction mixture, which was at 80° C., the thioallophanatization reaction was initiated, with the temperature rising up to 85° C. on the basis of the reaction with its exothermic onset. Stirring continued at 85° C. until, about an hour after addition of the catalyst, the NCO content had dropped to 34.9%. The reaction was stopped by addition of 0.1 g of orthophosphoric acid and the unreacted monomeric HDI was removed in a thin-film evaporator at a temperature of 130° C. and a pressure of 0.1 mbar. This gave 538 g of a virtually colourless, clear polyisocyanate mixture whose characteristics and composition were as follows:
  NCO content: 14.4%
  Monomeric HDI: 0.08%
  Viscosity (23° C.): 291 mPas
  Thiourethane: 0.0 mol %
  Thioallophanate: 91.2 mol %
  Isocyanurate groups: 8.8 mol %
Pollisocyanate Component A2)

1008 g (6 mol) of hexamethylene diisocyanate (HDI) were introduced under dry nitrogen with stirring at a temperature of 80° C., and 0.1 g of zinc(II) 2-ethyl-1-hexanoate as catalyst was added. Over a period of about 30 minutes, 196 g (1.0 mol) of mercaptopropyltrimethoxysilane were added dropwise, the temperature of the mixture rising up to 85° C. on account of the reaction with its exothermic onset.

The reaction mixture was stirred further at 85° C. until after about 2 hours the NCO content dropped to 34.9%. The catalyst was deactivated by addition of 0.1 g of orthophosphoric acid and the unreacted monomeric HDI was removed in a thin-film evaporator at a temperature of 130° C. and a pressure of 0.1 mbar. This gave 523 g of a virtually colourless, clear polyisocyanate mixture, whose characteristics and composition were as follows:
  NCO content: 14.2%
  Monomeric HDI: 0.05%
  Viscosity (23° C.): 249 mPas
  Thiourethane: 0.0 mol %
  Thioallophanate: 98.5 mol %
  Isocyanurate groups: 1.5 mol %
Polyisocyanate Component A3)

In accordance with the method described for polyisocyanate component B 2), 1344 g (8 mol) of HDI were reacted in the presence of 0.15 g of zinc(II) 2-ethyl-1-hexanoate with 196 g (1.0 mol) of mercaptopropyltrimethoxysilane at a temperature of 85° C. until the NCO content was 38.2%. After the reaction had been stopped with 0.15 g of orthophosphoric acid and the reaction mixture had been worked up by distillation in a thin-film evaporator, 528 g were obtained of a virtually colourless, clear polyisocyanate mixture, whose characteristics and composition were as follows:
  NCO content: 15.2%
  Monomeric HDI: 0.12%
  Viscosity (23° C.): 209 mPas
  Thiourethane: 0.0 mol %
  Thioallophanate: 99.0 mol %
  Isocyanurate groups: 1.0 mol %
Polyisocyanate Component A4)

In accordance with the method described for polyisocyanate component B 2), 672 g (4 mol) of HDI were reacted in the presence of 0.1 g of zinc(II) 2-ethyl-1-hexanoate with 196 g (1.0 mol) of mercaptopropyltrimethoxysilane at a temperature of 85° C. until the NCO content was 29.0%. After the reaction had been stopped with 0.1 g of orthophosphoric acid and the reaction mixture had been worked up by distillation in a thin-film evaporator, 486 g were obtained of a virtually colourless, clear polyisocyanate mixture, whose characteristics and composition were as follows:
  NCO content: 12.9%
  Monomeric HDI: 0.06%
  Viscosity (23° C.): 298 mPas
  Thiourethane: 0.0 mol %
  Thioallophanate: 98.3 mol %
  Isocyanurate groups: 1.7 mol %
Polyisocyanate Component A5)

In accordance with the method described for polyisocyanate component B 2), 756 g (4.5 mol) of HDI were reacted in the presence of 0.1 g of zinc(II) 2-ethyl-1-hexanoate with 294 g (1.5 mol) of mercaptopropyltrimethoxysilane at a temperature of 85° C. until the NCO content was 24.0%. After the reaction had been stopped with 0.1 g of orthophosphoric acid and the reaction mixture had been worked up by distillation in a thin-film evaporator, 693 g were obtained of a virtually colourless, clear polyisocyanate mixture, whose characteristics and composition were as follows:
  NCO content: 11.8%
  Monomeric HDI: 0.06%
  Viscosity (23° C.): 452 mPas Thiourethane: 0.0 mol %
Thioallophanate: 99.0 mol %
Isocyanurate groups: 1.0 mol %
Silane group content: 25.9% (calculated as —Si(OCH$_3$)$_3$; mol. weight=121 g/mol)

Polyisocyanate Component A6)

In accordance with the method described for polyisocyanate component B 2), 756 g (4.5 mol) of HDI were reacted in the presence of 0.1 g of zinc(II) 2-ethyl-1-hexanoate with 357 g (1.5 mol) of mercaptopropyltriethoxysilane at a temperature of 85° C. until the NCO content was 22.6%. After the reaction had been stopped with 0.1 g of orthophosphoric acid and the reaction mixture had been worked up by distillation in a thin-film evaporator, 715 g were obtained of a virtually colourless, clear polyisocyanate mixture, whose characteristics and composition were as follows:

NCO content: 11.3%
Monomeric HDI: 0.21%
Viscosity (23° C.): 267 mPas
Thiourethane: 0.0 mol %
Thioallophanate: 98.4 mol %
Isocyanurate groups: 1.6 mol %

Polyisocyanate Component A7)

504 g (3.0 mol) of HDI were introduced under dry nitrogen with stirring at a temperature of 80° C., and 588 g (3.0 mol) of mercaptopropyltrimethoxysilane were added over the course of 30 minutes. The reaction mixture was stirred further at 80° C. until after about 12 hours the NCO content of 11.5% was reached, corresponding to complete thiourethanization. 0.1 g of zinc(II) 2-ethyl-1-hexanoate was added as catalyst to the reaction mixture, which was at 80° C., whereupon the temperature rose up to 85° C. owing to the thioallophanatization reaction with its exothermic onset. The mixture was stirred further at 85° C. until after about 4 hours from addition of catalyst, the NCO content dropped to 3.0%. The reaction was subsequently stopped by addition of 0.1 g of orthophosphoric acid. This gave a virtually colourless, clear polyisocyanate mixture, whose characteristics and composition were as follows:

NCO content: 3.0%
Monomeric HDI: 0.69%
Viscosity (23° C.): 9220 mPas
Thiourethane: 23.2 mol %
Thioallophanate: 66.6 mol %
Isocyanurate groups: 10.2 mol %

Polyisocyanate Component A8)

1332 g (6 mol) of isophorone diisocyanate (IPDI) were introduced under dry nitrogen with stirring at a temperature of 95° C., and 0.2 g of zinc(II) 2-ethyl-1-hexanoate as catalyst was added. Over a period of about 30 minutes, 196 g (1.0 mol) of mercaptopropyltrimethoxysilane were added dropwise, with the temperature of the mixture rising to 103° C. owing to the reaction with its exothermic onset. The reaction mixture was stirred further at 100° C. until after about 5 hours the NCO content dropped to 27.4%. The catalyst was deactivated by addition of 0.2 g of orthophosphoric acid, and the unreacted monomer IPDI was removed in a thin-film evaporator at a temperature of 160° C. and a pressure of 0.1 mbar. This gave 659 g of a pale yellow, clear polyisocyanate mixture, whose characteristics and composition were as follows:

NCO content: 11.6%
Monomeric IPDI: 0.46%
Viscosity (23° C.): 11 885 mPas
Thiourethane: 1.3 mol %
Thioallophanate: 93.4 mol %
Isocyanurate groups: 4.3 mol %

Polyisocyanate Component A9)

756 g (4.5 mol) of HDI at a temperature of 80° C., under dry nitrogen and with stirring, were admixed dropwise over a period of about 30 minutes with 196 g (1.0 mol) of mercaptopropyltrimethoxysilane. The reaction mixture was subsequently heated to 140° C. and stirred further until after about 5 hours the NCO content had dropped to 24.0%. Distillative work-up in a thin-film evaporator gave 685 g of a virtually colourless, clear polyisocyanate mixture, whose characteristics and composition were as follows:

NCO content: 11.8%
Monomeric HDI: 0.08%
Viscosity (23° C.): 447 mPas
Thiourethane: 0.0 mol %
Thioallophanate: 98.6 mol %
Isocyanurate groups: 1.4 mol %

Polyisocyanate Components A10)-A13) and Comparative Polyisocyanate C1)

80 parts by weight of a low-monomer-content polyisocyanurate polyisocyanate based on HDI, with an NCO content of 21.6%, an average isocyanate functionality of 3.5 and a viscosity (23° C.) of 3200 mPas, were admixed with 20 parts by weight of the thioallophanate polyisocyanate A5) and homogenized by 30 minutes of stirring at 60° C. to give a silane-functional polyisocyanate mixture A10). By the same method, using the amounts listed in Table 1 below of the same starting components, the silane-functional polyisocyanate mixtures A11) to A13) were produced.

For comparison, drawing on Example 1 of WO 2009/156148, solvent-free reaction of 79 parts by weight of the above-described low-monomer-content polyisocyanurate polyisocyanate based on HDI (NCO content: 21.6%; average NCO functionality: 3.5; viscosity (23° C.): 3200 mPas) with 21 parts by weight of mercaptopropyltrimethoxysilane in the presence of 500 ppm of dibutyltin dilaurate as catalyst at 60° C. produced a partly silanized HDI trimer (comparative polyisocyanate C1).

Table 1 below shows compositions (parts by weight) and characteristics of the silane-functional polyisocyanate mixtures A10) to A13) and also the characteristics of comparative polyisocyanate C1) according to WO 2009/156148.

TABLE 1

| Polyisocyanate | A10) | A11) | A12) | A13) | C1) |
| --- | --- | --- | --- | --- | --- |
| HDI polyisocyanurate | 80 | 70 | 60 | 50 | — |
| Polyisocyanate A5) | 20 | 30 | 40 | 50 | — |
| NCO content [%] | 19.6 | 18.7 | 17.6 | 16.7 | 12.6 |
| Viscosity (23° C.) [mPas] | 2240 | 1820 | 1490 | 1210 | 11800 |
| average NCO functionality | 3.2 | 3.1 | 2.9 | 2.8 | 2.6 |

A direct comparison of the silane-functional polyisocyanate mixture A13) with the comparative polyisocyanate C1) according to WO 2009/156148, both having a silane group content (calculated as —Si(OCH$_3$)$_3$; mol. weight=121 g/mol) of 13%, impressively demonstrates the distinct advantage of the silane-functional thioallophanate polyisocyanates in terms of isocyanate content, isocyanate functionality and viscosity relative to the existing state of the art.

Comparative Polyisocyanate C2) (Silane Group-free)

HDI polyisocyanate containing isocyanurate and iminooxadiazinedione groups, prepared in accordance with Example 4 of EP-A 0 962 455, by trimerization of HDI using a 50% solution of tetrabutylphosphonium hydrogendifluoride in isopropanol/methanol (2:1) as catalyst. The reaction was stopped when the NCO content of the crude mixture was 43%, by addition of dibutyl phosphate. Subsequently, unconverted HDI was removed by thin-film distillation at a temperature of 130° C. and a pressure of 0.2 mbar.
NCO content: 23.4%
NCO functionality: 3.2
Monomeric HDI: 0.2%
Viscosity (23° C.): 700 mPas
Isocyanurate: 49.9 mol %
Iminooxadiazinedione 45.3 mol %
Uretdione 4.8 mol %

Examples 1 and 2 (Inventive and Comparative)

An inventive coating composition was produced by mixing 100 parts by weight of a commercial aqueous hydroxy-functional polyacrylate dispersion having a solids content of 42% and an OH content of 5.0%, based on resin solids, available under the name Bayhydrol® A 2695 (Bayer MaterialScience AG, Leverkusen), with 0.21 part by weight of a commercial silicone surfactant (Byk-349, Byk Chemie GmbH), 0.49 part by weight of a 10% aqueous solution of a commercial silicone surface additive (Byk-378, Byk Chemie GmbH), 0.44 part by weight of a commercial fluoro-surfactant (Novec FC-4430, 3M Deutschland GmbH) and 0.49 part by weight of a commercial thickener (Borchi Gel PW 25, OMG Borchers GmbH) and diluting the mixture with 14.0 parts by weight of water.

Added to this batch were 93.2 parts by weight of a crosslinker solution consisting of 88.2 parts by weight of a 65% solution of the silane-group-containing thioallophanate A5) in MPA, 3.0 parts by weight of 50% solution of a commercial UV absorber (Tinuvin 348-2, BASF SE) in MPA and 2.0 parts by weight of a 50% solution of a commercial radical scavenger (Tinuvin 292, BASF SE) in MPA (corresponding to an equivalent ratio of isocyanate groups to alcoholic hydroxyl groups of 1.3:1), and the mixture was homogenized by stirring for 5 minutes at 1000 rpm.

For comparison, the same method was used to formulate a paint batch from 100 parts by weight of Bayhydrol® A 2695, using the additives specified above, and this batch was admixed with 47.5 parts by weight of a crosslinker solution, consisting of 44.5 parts by weight of a 65% solution of the comparative polyisocyanate C2) in MPA, 2.1 parts by weight of a 50% solution of a commercial UV absorber (Tinuvin 348-2, BASF SE) in MPA and 0.9 part by weight of a 50% solution of a commercial radical scavenger (Tinuvin 292, BASF SE) in MPA, (corresponding to an equivalent ratio of isocyanate groups to alcoholic hydroxyl groups of 1.3:1).

The working life of the two application-ready coating compositions produced in this way was about 2 hours in each case.

For determination of the pendulum damping, the two coating compositions were each applied to glass plates in an application film thickness of 60 µm, using a four-way bar applicator, with drying in one instance at room temperature (about 20° C.) and, after 15 minutes of flashing in each case, under forced conditions (30 min/60° C.).

The scratch resistance was tested on complete multi-coat paint systems. For this purpose, the inventive coating composition and the comparative coating composition were applied as clearcoats in an application film thickness of 60 µm, using a four-way bar applicator, to aluminium panels which had been coated beforehand with a commercial 1 component OEM waterborne surfacer and with a conventional black 1-component OEM waterborne basecoat.

Table 2 below shows the results of the performance tests in a comparison.

TABLE 2

| | | Example | | | |
|---|---|---|---|---|---|
| | | 1 | | 2 (comparative) | |
| Drying conditions | | RT | 2 h/60° C. | RT | 2 h/60° C. |
| Pendulum damping | after 1 day | 38 s | 93 s | 133 s | 184 s |
| | after 7 days | 152 s | 165 s | 166 s | 188 s |
| | after 14 days | 180 s | 183 s | 172 s | 194 s |
| Initial gloss (20°/60°) | | 96/99 | 96/98 | 90/97 | 94/98 |
| Wet scratching, relative residual gloss (20°/60°) | immediate | 63.3/63.4 | 61.8/77.7 | 33.3/59.8 | 37.9/63.4 |
| | after reflow | 70.0/78.7 | 70.8/79.8 | 36.9/60.9 | 42.5/65.6 |
| Dry scratching, relative residual gloss (20°/60°) | immediate | 26.7/70.2 | 29.2/70.2 | 26.2/67.4 | 21.8/63.4 |
| | after reflow | 95.6/97.9 | 87.6/92.6 | 47.6/78.3 | 44.8/77.4 |
| Accelerated weathering (20°/60°) | start | 96/99 | 96/98 | 90/97 | 94/98 |
| | after 500 h | 98/100 | 98/100 | 72/92 | 92/97 |
| | after 1000 h | 97/99 | 98/99 | 74/92 | 92/96 |
| | after 1500 h | 97/99 | 98/100 | 80/94 | 93/97 |
| | after 2000 h | 97/99 | 98/99 | 77/93 | 93/97 |
| | after 2500 h | 93/96 | 93/96 | 75/90 | 88/94 |
| | ΔE after 2500 h | 0.5 | 0.6 | 0.8 | 0.9 |

The comparison shows that the coating film obtained from the coating composition of the invention has a significantly higher residual gloss, immediately after wet scratching, than the coating material crosslinked with the standard polyisocyanate. With dry scratching, both coating films initially suffer a similarly severe loss of gloss, but under reflow conditions the coating material of the invention regains close to its original gloss. In the accelerated weathering test, furthermore, the coating material of the invention is notable for significantly better gloss retention and less yellowing.

The invention claimed is:

1. An aqueous coating composition comprising
   A) at least one polyisocyanate component,
   B) at least one aqueous polymer dispersion,
   C) optionally at least one catalyst for the crosslinking of silane groups and
   D) optionally further auxiliaries and additives,
   where the polyisocyanate component A) comprises at least one thioallophanate containing silane groups, of the general formula (I),

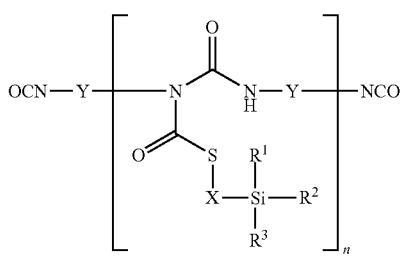

(I)

in which
- $R^1$, $R^2$ and $R^3$ are identical or different radicals and are each a saturated or unsaturated, linear or branched, aliphatic or cycloaliphatic or an optionally substituted aromatic or araliphatic radical having up to 18 carbon atoms, which may optionally contain up to 3 heteroatoms from the series of oxygen, sulphur and nitrogen,
- X is a linear or branched organic radical having at least 2 carbon atoms,
- Y is a linear or branched, aliphatic or cycloaliphatic, an ariphatic or aromatic radical having up to 18 carbon atoms and
- n is an integer from 1 to 20.

2. The coating composition according to claim 1, characterized in that the polyisocyanate component A) comprises at least one thioallophanate containing silane groups, of the formula (I), in which
- $R^1$, $R^2$ and $R^3$ are identical or different radicals and are each a saturated, linear or branched, aliphatic or cycloaliphatic radical having up to 6 carbon atoms, and optionally contain up to 3 oxygen atoms, and
- X is a linear or branched alkylene radical having 2 to 10 carbon atoms, and
- Y and n are as defined in claim 1.

3. The coating composition according to claim 1, characterized in that the polyisocyanate component A) comprises at least one thioallophanate containing silane groups, of the formula (I), in which
- $R^1$, $R^2$ and $R^3$ are each alkyl radicals having up to 6 carbon atoms and/or alkoxy radicals which contain up to 3 oxygen atoms, with the proviso that at least one of the radicals $R^1$, $R^2$ and $R^3$ is such an alkoxy radical, and
- X is a propylene radical (—$CH_2$—$CH_2$—$CH_2$—),
- Y and n are as defined in claim 1.

4. The coating composition according to claim 1, characterized in that the polyisocyanate component A) comprises at least one thioallophanate containing silane groups, of the formula (I), in which
- $R^1$, $R^2$ and $R^3$ are identical or different radicals and are each methyl, methoxy or ethoxy, with the proviso that at least one of the radicals $R^1$, $R^2$ and $R^3$ is a methoxy or ethoxy radical,
- X is a propylene radical (—$CH_2$—$CH_2$—$CH_2$—), and
- Y and n are as defined in claim 1.

5. The coating composition according to claim 1, characterized in that the polyisocyanate component A) comprises at least one thioallophanate containing silane groups, of the formula (I), in which
- Y is a linear or branched, aliphatic or cycloaliphatic radical having 5 to 13 carbon atoms.

6. The coating composition according to claim 1, characterized in that the polyisocyanate component A) comprises at least one thioallophanate containing silane groups, of the formula (I), in which Y is an aliphatic and/or cycloaliphatic radical as obtained by removing the isocyanate groups from a diisocyanate selected from the series of 1,5-diisocyanatopentane, 1,6-diisocyanatohexane, 1-isocyanato-3,3,5-trimethyl-5-isocyanatomethylcyclohexane, 2,4'- and/or 4,4'-diisocyanatodicyclohexylmethane.

7. The coating composition according to claim 1, characterized in that the aqueous polymer dispersion B) comprises at least one aqueous or water-dispersible polyacrylate resin, polyester resin, polyurethane resin, polyurea resin, polycarbonate resin and/or polyether resin.

8. The coating composition according to claim 7, characterized in that the aqueous polymer dispersion B) comprises at least one aqueous secondary polyacrylate dispersion $B_1$), a polyester-polyacrylate-dispersion $B_3$) and/or a polyurethane dispersion $B_4$) based on polyester polyols, polycarbonate polyols and/or C3 and C4 polyether polyols.

9. The coating composition according to claim 7, characterized in that the aqueous polymer dispersion B) contains hydroxyl groups and/or amino groups.

10. The coating composition according to claim 9, characterized in that the catalyst C) comprises at least one amine-blocked acidic phosphoric ester, an amine-blocked sulphonic acid and/or at least one tetraalkylammonium carboxylate.

11. The coating composition according to claim 9, characterized in that the catalyst component C) comprises at least one amine-blocked phosphoric acid phenyl ester, an amine-blocked phosphoric acid bis(2-ethylhexyl) ester, tetraethylammonium benzoate and/or tetrabutylammonium benzoate.

12. A method for producing the coating composition according to claim 1, comprising mixing components A), B), optionally C) and optionally D) in any order in succession or together in proportions such that for each hydroxyl and/or amino group of the polymer dispersion B) there are from 0.5 to 2.0 isocyanate groups of the polyisocyanate component A).

13. A method for producing polyurethane paints and coatings comprising curing the coating composition according to claim 1.

14. The method according to claim 13, characterized in that the coating compositions are cured in a temperature range from 20 to 200° C. during a time of 1 min to 24 h.

15. A substrates coated with the coating composition according to claim 1.

16. A method for producing the coating composition according to claim 1, comprising mixing components A), B), optionally C) and optionally D) in any order in succession or together in proportions such that for each hydroxyl and/or amino group of the polymer dispersion B) there are from 0.6 to 1.8 isocyanate groups of the polyisocyanate component A).

17. A method for producing the coating composition according to claim 1, comprising mixing components A), B), optionally C) and optionally D) in any order in succession or together in proportions such that for each hydroxyl and/or amino group of the polymer dispersion B) there are from 0.7 to 1.5 isocyanate groups of the polyisocyanate component A).

18. The method according to claim 13, characterized in that the coating compositions are cured in a temperature range from 30 to 190° C. during a time of 2 min to 12 h.

19. The method according to claim 13, characterized in that the coating compositions are cured in a temperature range from 50 to 180° C. during a time of 3 min to 8 h.

* * * * *